(12) United States Patent
Lee et al.

(10) Patent No.: US 7,644,140 B2
(45) Date of Patent: Jan. 5, 2010

(54) SYSTEMS AND METHODS FOR PROLIFERATING A COMPUTING DEVICE CONFIGURATION

(75) Inventors: Sam Jung-Won Lee, Spring, TX (US); Norman P. Brown, Tomball, TX (US); William R. Whipple, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 895 days.

(21) Appl. No.: 10/971,622

(22) Filed: Oct. 21, 2004

(65) Prior Publication Data

US 2006/0089979 A1 Apr. 27, 2006

(51) Int. Cl.
*G06F 15/177* (2006.01)
(52) U.S. Cl. .................. 709/220; 709/205; 709/224; 709/221; 709/215; 709/216; 709/203; 709/217; 705/14; 705/28; 705/27; 707/1; 707/10

(58) Field of Classification Search .................. 709/219, 709/203, 220, 226, 250, 225, 227, 224, 221, 709/217, 215, 205
See application file for complete search history.

(56) References Cited

U.S. PATENT DOCUMENTS

| 6,101,537 A * | 8/2000 | Edelstein et al. ............. 709/219 |
| 6,917,958 B1 * | 7/2005 | Howe et al. .................. 709/203 |
| 2006/0179116 A1 * | 8/2006 | Speeter et al. .............. 709/217 |

* cited by examiner

*Primary Examiner*—Jude J Jean Gilles

(57) ABSTRACT

In one embodiment, a system and method for proliferating a computing device configuration relates to generating a categorized registry file including at least one registry entry that is categorized relative to a feature of the source computing device to which the at least one registry entry pertains, providing the categorized registry file to a target computing device, determining whether to import the at least one registry entry relative to a category to which the at least one registry entry is related, and importing the at least one registry entry into a registry of the target computing device if it is determined to so import it.

18 Claims, 9 Drawing Sheets

SYSTEMS AND METHODS FOR PROLIFERATING A COMPUTING DEVICE CONFIGURATION

BACKGROUND

Corporate enterprises typically comprise many computers that their employees use. For instance, an enterprise may employ thousands of such computers at various locations within a country or across the globe.

In such situations, the enterprise may endeavor to harmonize the configurations of the computers to, among other things, simplify administration of and maintenance for the computers. This may be particularly true in cases in which the computers are terminal computers that comprise an embedded operating system (i.e., an operating system stored in solid-state memory) that communicates with a central server to access programs that reside on the server.

There are various ways in which such harmonization can be achieved. The most common method is to install a master "disk" image on each computer. In that process, a master computer is configured so as to have a configuration that is desired for the other computers (i.e., the slave computers). Once configuration of the master computer is completed, a snapshot of its disk image is captured and distributed to each of the slave computers, typically over a network, and the image is deployed on each slave computer so that each will have the same configuration as the master computer.

Although the above-described method is viable, it is disadvantageous in terms of network bandwidth requirements. Specifically, when the entire disk image is to be redeployed for each slave computer, a relatively large amount of data is transmitted over the network (e.g., the Internet), when only the configuration data is actually required. In addition to consuming an undue amount of network bandwidth, this method can be particularly problematic when the disk image is being transmitted to remote offices via a satellite link or a dial-up connection.

Instead of transmitting the entire system disk to the slave computers, the configuration data alone can be transmitted to the slave computers. For instance, the registry entries of the master computer could be distributed to and deployed on each slave computer. Although such a solution reduces the amount of data that must be transmitted, it too has inherent drawbacks.

One drawback is that such a solution is an "all-or-nothing" solution in which all slave registry entries are replaced by the master registry entries. Such replacement may be undesirable in several circumstances. For example, if the slave computer comprises an application that the master computer does not, the registry entries for the application on the slave computer will be lost and the application will be orphaned. Alternatively, if the master computer comprises an application that the slave computer does not, orphaned registry entries will be implemented on the slave computer. In another case, the users of the slave computers may wish to maintain certain existing registry entries. For example, if the master computer is configured so that the computer's mouse is set for right-handed use, left-handed users may not wish the registry entry specifying right-handed use be implemented on their computers.

A further drawback is that, even if the master and slave computers comprise the same software (e.g., operating system, applications), the software on one computer may be a different version from that on another computer. For example, if the master computer comprises Program A, version 2.0, and the slave computers comprise Program A, version 1.0, the master registry entries may not be directly compatible with to the slave computer's Program A.

SUMMARY

In one embodiment, a system and method for proliferating a computing device configuration relates to generating a categorized registry file including at least one registry entry that is categorized relative to a feature of the source computing device to which the at least one registry entry pertains, providing the categorized registry file to a target computing device, determining whether to import the at least one registry entry relative to a category to which the at least one registry entry is related, and importing the at least one registry entry into a registry of the target computing device if it is determined to so import it.

BRIEF DESCRIPTION OF THE DRAWINGS

The systems and methods of this disclosure can be better understood with reference to the following drawings. The components in the drawings are not necessarily to scale.

DETAILED DESCRIPTION

As described in the foregoing, a given concern, such as a corporate enterprise, may wish to harmonize the configurations of many different computing devices throughout the organization. Although such harmonization can be achieved by redeploying a master system image on each computing device, such a solution can consume an undue amount of network bandwidth. Although such a problem can, in some cases, be avoided by simply deploying the a master registry on each computing device, that solution can result in orphaned applications or registry entries, and/or can result incompatible registry entries being implemented.

As is described in the following, effective harmonization of the configurations of multiple computing devices can be achieved by providing a modified version of a source registry file to each of several target computing devices. In some embodiments, the various entries of the source registry file are categorized according to feature, for instance using one or more filters. Upon receipt of the modified registry file, the target computing devices can determine which registry entries to implement, which to ignore, and which to translate (e.g., from one version to another), using one or more filters. With such operation, only desired registry entries in the correct format are proliferated.

Figure 1:
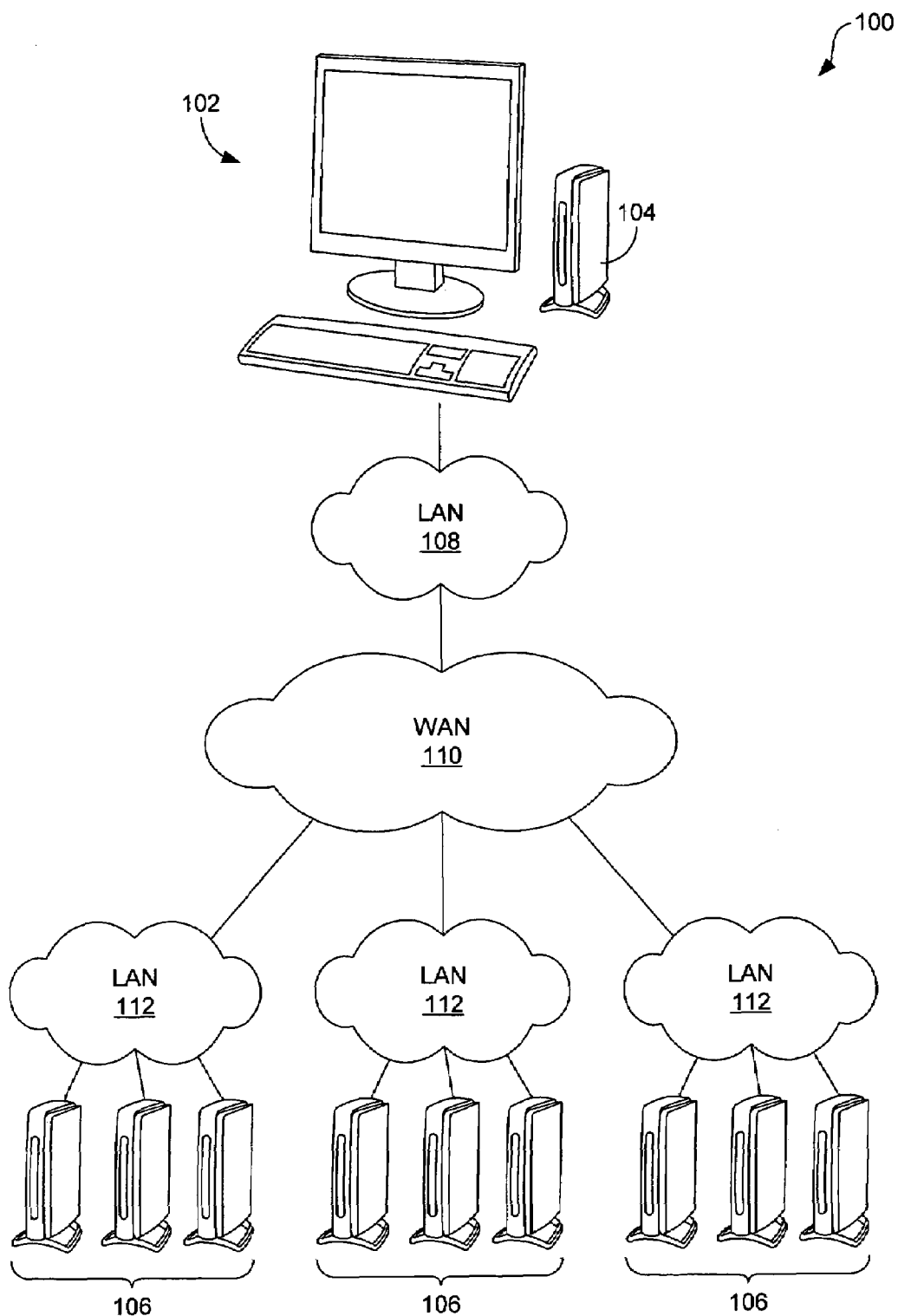
FIG. 1 is a schematic view of an embodiment of a system in which a configuration of a source computing device can be provided to and at least partially implemented on a plurality of target computing devices.

Referring now in more detail to the figures in which like numerals identify corresponding parts, FIG. 1 illustrates an example system 100 in which configuration proliferation can be practiced. As is indicated in the figure, the system 100 comprises a source computing system 102, which includes a source computing device 104, and a plurality of remote target computing devices 106, which are similar to the source computing device. By way of example, the source computing device 104 and the target computing devices 106 comprise terminal computers having embedded operating systems stored in solid-state memory. In such a case, the computing devices 104, 106 may differ, in at least one respect, from conventional personal computers (PCs) by not comprising a hard drive or other mass storage device. Although terminal computers have been specifically identified, the computing devices 104, 106 could, in alternative embodiments, comprise other types of computers such as PCs, notebook computers, or other types of computers whose configuration can be changed through modification of a system registry.

The source computing device 104, or "source," communicates with the target computing devices 106, or "targets," though one or more networks. For instance, in the example arrangement of FIG. 1, the source 104 communicates to the targets 106 via a source local-area network (LAN) 108 to which the source is coupled, a wide-area network (WAN) 110, and one or more target LANs 112 to which one or more targets are coupled.

By way of example, the source LAN 108 is a network located at a centralized location (e.g., headquarters office) of a concern, such as an corporate enterprise, and the WAN 110 comprises a network that connects the source LAN to the target LANs 112 that exist in remote locations (e.g., satellite offices) of the concern. In such a scenario, the targets 106 may each be connected to their associated LANs 112, which in turn may be connected to a central server (not shown) that acts as a gateway to the LAN. Although a particular configuration of the network(s) existing between the source 104 and the targets 106 is illustrated in FIG. 1 and has been described above, this configuration is a mere example and many other arrangements are possible. For instance, the source 104 and one or more targets 106 could, in some cases, be connected to the same network (e.g., LAN).

Figure 2:
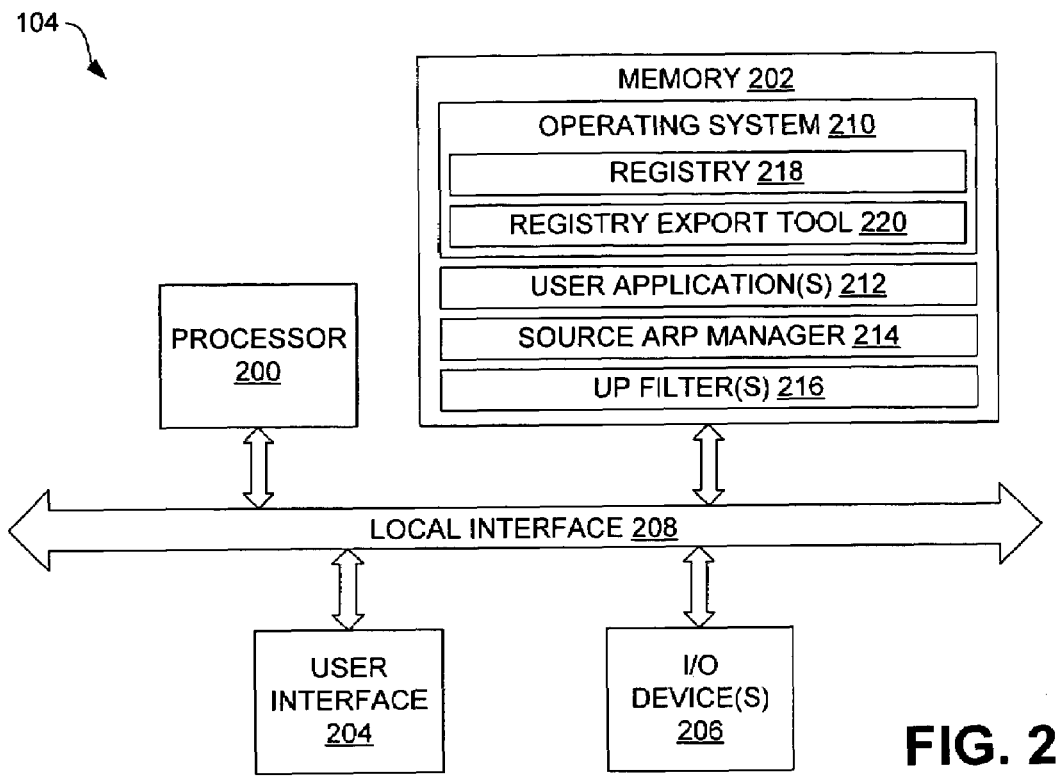
FIG. 2 is a block diagram of an embodiment of a source computing device shown in FIG. 1.

FIG. 2 is a block diagram illustrating an example architecture for the source 104 shown in FIG. 1. As is indicated in FIG. 2, the source 104 comprises a processor 200, memory 202, a user interface 204, and one or more input/output (I/O) devices 206, each of which is connected to a local interface 208.

The processor 200 can include any custom-made or commercially-available processor, a central processing unit (CPU), an auxiliary processor among several processors associated with the computing device 102, or a semiconductor-based microprocessor (in the form of a microchip).

The memory 202 includes one or more volatile memory elements (e.g., read access memory (RAM)) and one or more nonvolatile memory elements (e.g., flash memory, magnetic RAM (MRAM), etc.). In embodiments in which the source 104 comprises no hard drive, the nonvolatile memory element(s) is/are used to store the software of the source in similar manner to a hard disk.

The user interface 204 comprises those components with which a user (e.g., system administrator) can directly interact with the source 104. Those components can comprise components that are typically used in conjunction with a PC, such as a keyboard, a mouse, and a display.

The one or more I/O devices 206 comprise the components used to facilitate connection of the source 104 to other devices and therefore, for instance, comprise one or more serial, parallel, small system interface (SCSI), or universal serial bus (USB), or IEEE 1394 connection elements. In addition, the I/O devices 206 comprise the components used to transmit and/or receive data over a network such as, for example, a network card or modem.

The memory 202 comprises various programs including an operating system 210, one or more user applications 212, and a source adaptive registry proliferation (ARP) manager 214. The operating system 210 controls the execution of other programs and provides scheduling, input-output control, file and data management, memory management, and communication control and related services. As is described above, the operating system 210 may be an embedded operating system stored within solid-state memory (e.g., in flash memory) of the source 104. The operating system 210 includes a registry 218 that comprises the various registry entries that, at least partially, define the configuration of the source 104, and a registry export tool 220 that is used to export the contents of the registry as a registry file (see discussion of FIG. 4 below).

The user applications 214 comprise those programs that execute on top of the operating system 212 and may comprise, for example, a network browser program (e.g., Internet browser), a remote access program (e.g., Citrix™), a media player program (e.g., audio and/or video player), etc. Alternative and/or additional applications may reside on the source 104, as desired.

The source ARP manager 214 is a program that is used to generate a modified version of a source registry file for the purpose of distributing the modified file to one or more targets 106 (FIG. 1) to, at least partially, configure the targets. As is described in greater detail below, the source APR manager 214 is, in some embodiments, configured to apply one or more up filters 216 to the source registry file so as to generate a modified registry file that is segmented by different categories, each pertaining to a particular feature for which one or more registry entries exist. Example features include one or more of the user applications 212 and one or more of the user interface devices 204, such as a keyboard, mouse, and display, and user applications. As is also discussed below, the categorization provided within the modified file enables the targets 106 to control which of the source registry entries to implement on the targets.

Figure 3:
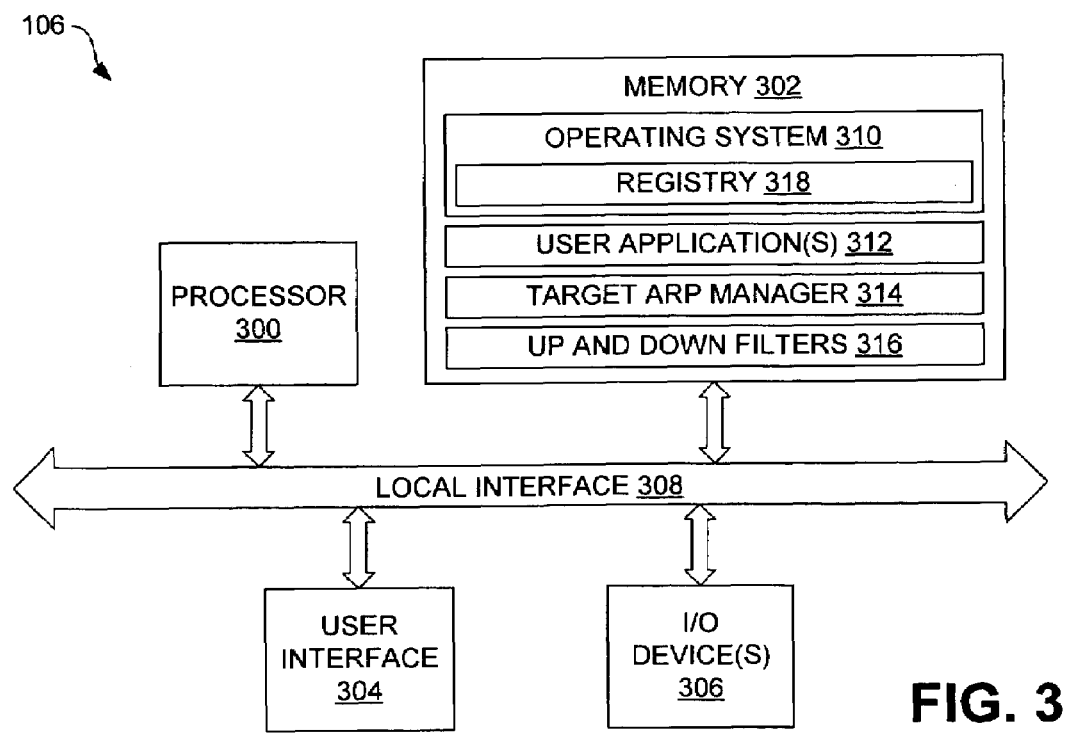
FIG. 3 is a block diagram of an embodiment of a target computing device shown in FIG. 1.

FIG. 3 is a block diagram illustrating an example architecture for a target 106 shown in FIG. 1. Normally, the target 106 is the same type of device as the source 104. Accordingly, the architecture of the target typically is similar to that of the source 104. Therefore, like the source 104, the target 106 can comprise a processor 300, memory 302, a user interface 304, and one or more I/O devices 306, each of which is connected to a local interface 308, each of which is similar in configuration and function to the like-named components described above in relation to FIG. 2. In view of these similarities, further discussion of the structure and functions of those components is omitted.

In the embodiment of FIG. 3, the memory 302 comprises an operating system 310 that includes a registry 318, one or more user applications 312, a target ARP manager 314, and one or more up and down filters 316. The target ARP manager 316 is a program that receives modified registry files from the source 104 and extracts various registry entries from those files (potentially all of the entries) for implementation on the target 106. As is described below, the target ARP manager 314, in some embodiments, applies one or more of the up and down filters 316 to the modified registry files to determine which of the entries contained in the files are to be implemented, which are to be ignored, and which are to be translated prior to being implemented.

Various programs (i.e., logic) have been described above. It is to be understood that those programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, example methods of configuration harmonization will now be described. In the discussions that follow, flow diagrams are provided. Any process steps or blocks in these flow diagrams may represent modules, segments, or portions of code that include one or more executable instructions for implementing specific logical functions or steps in the process. Although particular example process steps are described, alternative implementations are feasible. For instance, some steps may be executed out of order from that shown and discussed depending on the functionality involved.

Figure 4:
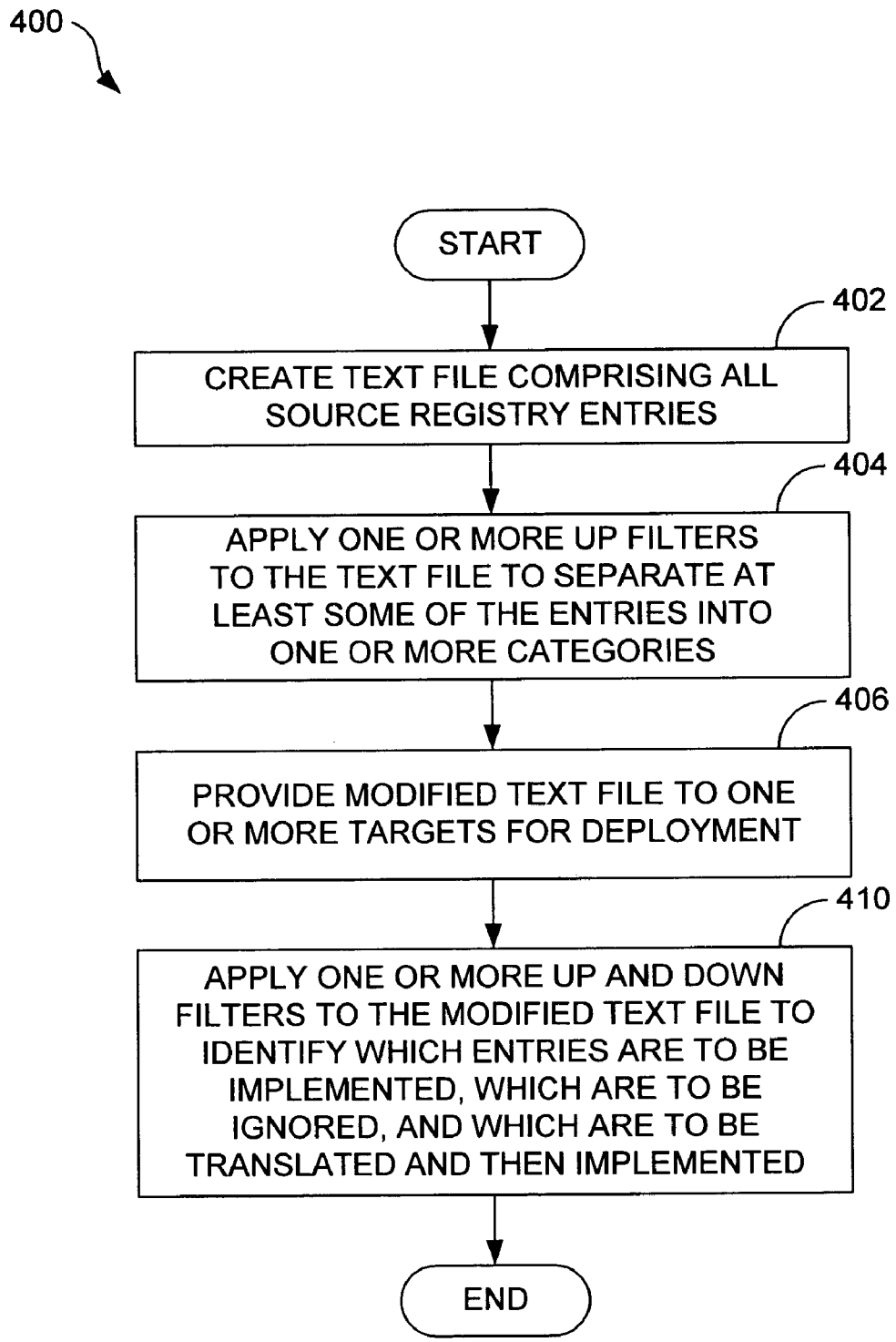
FIG. 4 is a flow diagram that illustrates an embodiment of a method for proliferating a computing device configuration.

FIG. 4 illustrates an example method 400 of proliferating computing device configuration. More particularly, FIG. 4 illustrates an example method for proliferating one or more registry entries from a source 104 to a target 106. Beginning with block 402, a text file comprising all of the registry entries of the source is created, for instance using the registry export tool 220 provided in the operating system 210. Next, one or more up filters are applied to the text file (registry file), for instance using the source ARP manager 214, to separate at least some of the registry entries into one or more categories, as indicated in block 404. In some embodiments, each filter is a text file that pertains to some feature for which registry entries are provided. Example features can include the various user applications 212 and the various user interface devices (e.g., keyboard, mouse, display). The granularity of the features can be chosen by the user (e.g., system administrator). For example, various aspects of the display, such as resolution and color, can be designated as separate features, and therefore filters, if desired.

Figure 5:
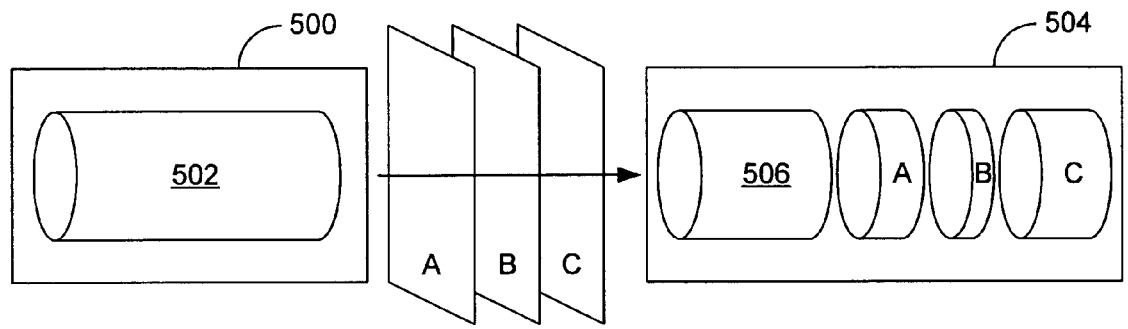
FIG. 5 is a schematic diagram that depicts an up-filtering process in which a registry file is segmented into different categories.

Through the application of the up filters, the source ARP manager 214 can generate a modified (i.e., categorized) text file in which one or more of the registry entries are organized according to category and, therefore, by the features to which the entries pertain. This process is schematically depicted in FIG. 5. As is shown in that figure, the original text file 500 includes a collection of uncategorized registry entries 502. When the registry entries are "passed through" the filters A, B, and C, a modified text file 504 results that comprises, for instance, uncategorized registry entries 506, and registry entries separated out into categories A, B, and C, pertaining to filters A, B, and C.

Referring back to FIG. 4, the modified text file can then be provided to one or more targets 106 for deployment, as indicated in block 406. Once the modified text file is received, one or more target up and down filters can be applied to the file, for example by the target ARP manager 314, to identify which entries are to be implemented, which are to be ignored, and which are to be translated and then implemented, as indicated in block 410. That determination is made in reference to the categorization of the registry entries within the modified text file, and the information contained within the target's up and down filters that, like the up filters, can each be a text file. Specifically, registry entries of the modified text file that correspond to entries of the filter(s) are stored to the target registry 318, entries of the modified text file that do not correspond to entries in the filter are ignored, and entries of the modified text file that correspond to entries in the filter, but which correspond to a different version (e.g., in the case of a user application), are translated and then stored to the target registry.

Figure 6:
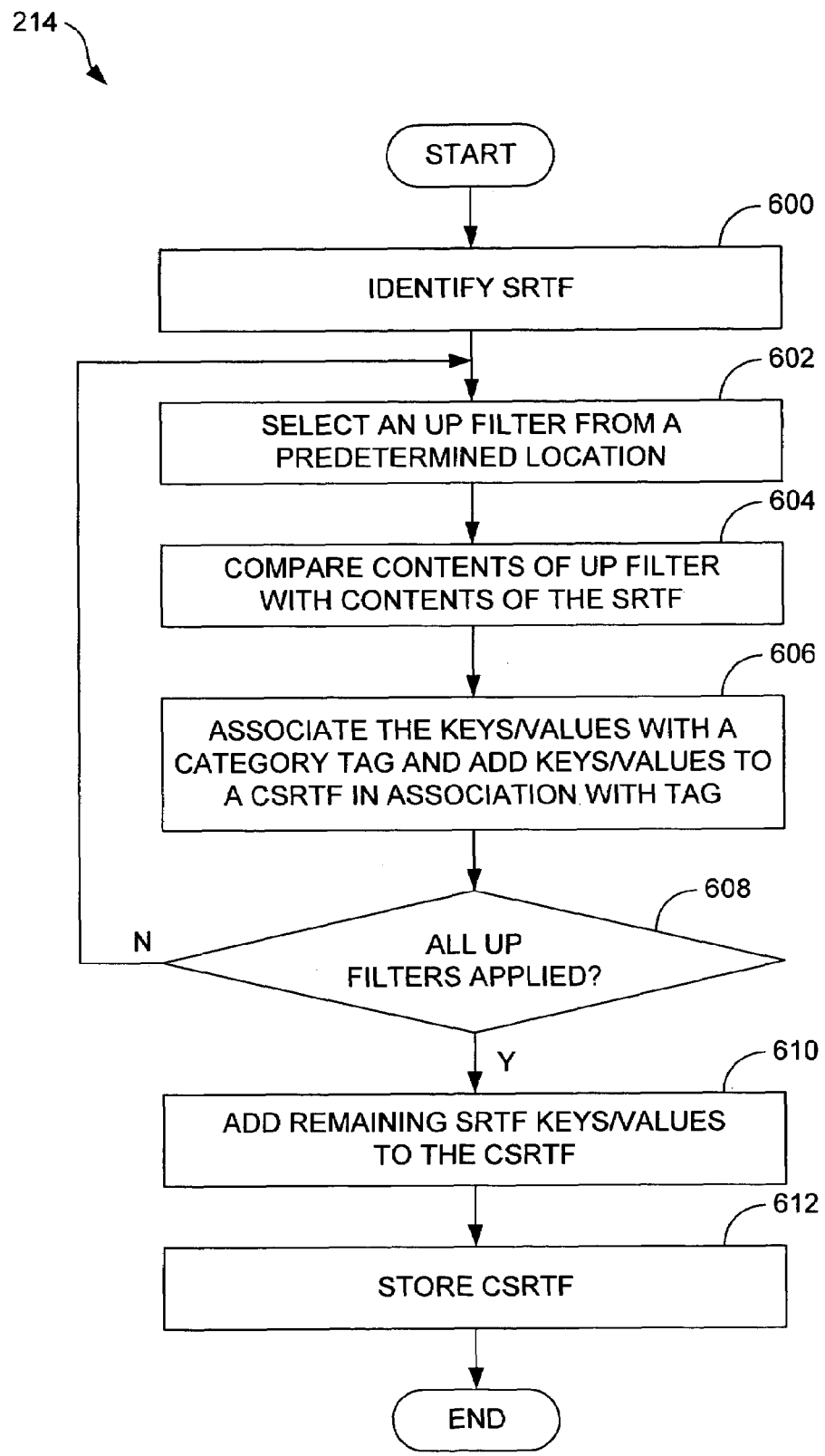
FIG. 6 is a flow diagram that illustrates an embodiment of operation of a source adaptive registry proliferation manager shown in FIG. 2.

FIG. 6 provides an example of operation of the source ARP manager 214 in generating a modified text file for provision to one or more targets 106. In the following discussion, it is assumed that a text file containing the source registry entries has been generated by an appropriate tool, such as the registry export tool 220 (FIG. 2). For the remainder of the disclosure, the text file will be called the source registry text file (SRTF).

Beginning with block 600, the source ARP manager 214 identifies the SRTF. By way of example, the location of the SRTF can be provided to the manager 214 by the user, or the manager can be configured to search for the SRTF in a predefined location.

Once the SRTF is located, the source ARP manager 214 selects an up filter to be applied to the SRTF from a predetermined location, as indicated in block 602. By way of example, the predetermined location may be a subdirectory or folder that is allocated for storing up filters on the source 104. For instance, the source location "\Hard Disk\Up Filters" could be established for this purpose. Filter selection can be arbitrary, for example in alphabetic order of the filter names. Alternatively, the filters can be selected in accordance with a predetermined order. In such a case, the order of the filters can, for instance, be specified with a notation contained within the source registry. In such a case, certain filters can be identified as "First" filters, so that they are applied first, or as "Last" filters, so that they are applied last. Controlling the order of application in that manner controls the order in which the categories are evaluated, and potentially implemented (i.e., stored in the target registry), on the target 106.

Figure 7:
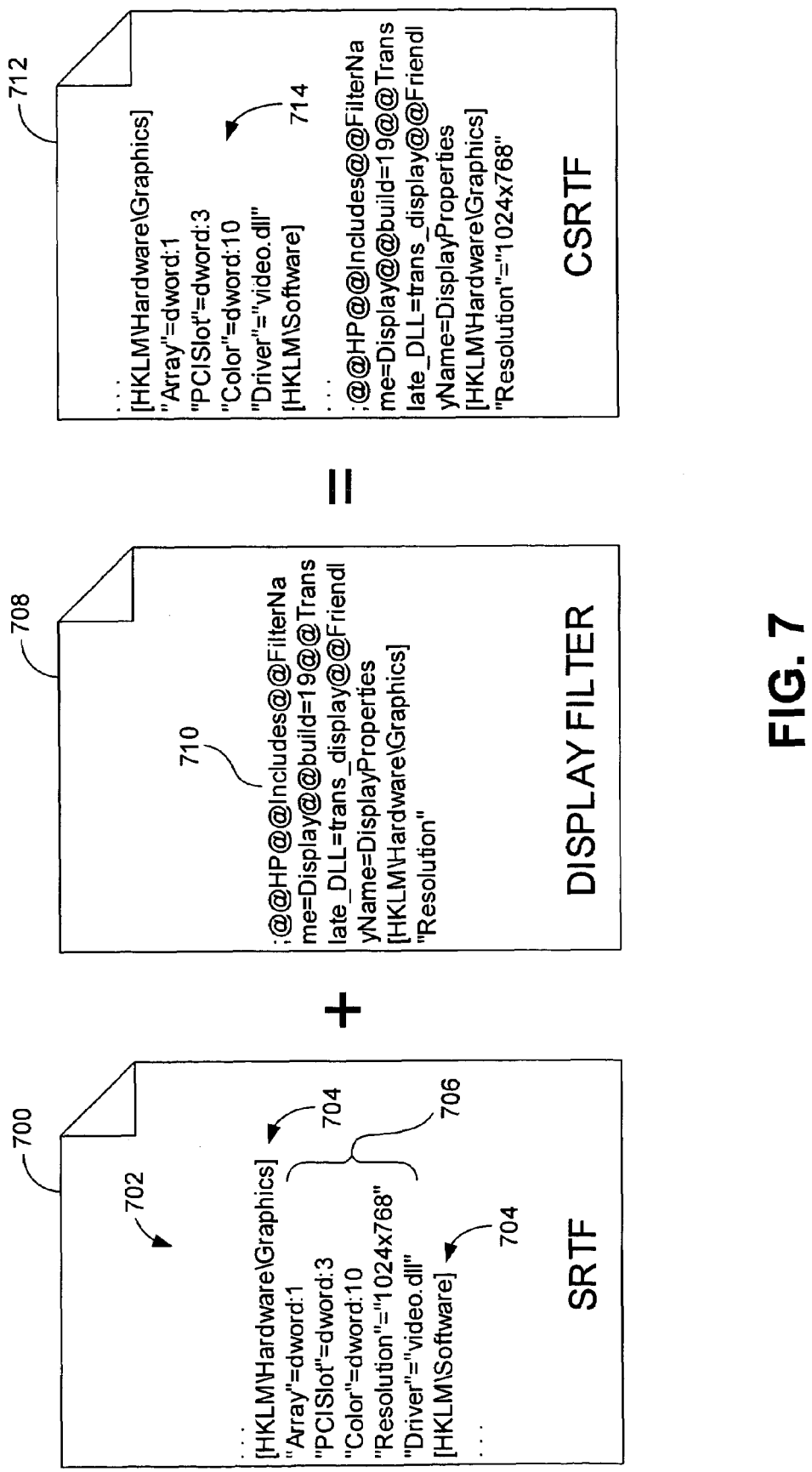
FIG. 7 is a schematic diagram that further depicts an up-filtering process in which a registry file is segmented into different categories.

Irrespective of the up filter location or order of application, the contents of the selected up filter are compared to the contents of the SRTF, as indicated in block 604. Through that comparison, the source ARP manager 214 can determine which keys, and associated values, of the up filter match a key/value of the SRTF. This concept is illustrated in FIG. 7. As is shown in that figure, an SRTF 700 comprises a plurality of registry entries 702 (only a few representative entries shown in FIG. 7). These entries include keys 704, such as "[HKLM\Hardware\Graphics]" and "[HKLM\Software]". Under each key 704 are various associated values 706. For instance, the values "Array," "PCISlot," "Color," "Resolution," and "Driver" are associated with the graphics key.

In the example scenario of FIG. 7, the feature to which the filter pertains is the display. In other words, a display filter 708 is being applied to the SRTF 700. The display filter 708 includes a category tag 710 that marks the beginning of a category to which information (keys and values) that follows pertains. The category tag 710 is a unique string of characters that comprises a plurality of fields that define attributes of the registry keys/values contained in the filter 708. As is shown in the figure, the category tag 710 of this example is:

;@@HP@@Includes@@FilterName=Display@@build= 19@@Transl ate_DLL=trans_display@@Friendly Name=DisplayProperties where ";@@HP" marks the beginning of the tag. The category tag 710 in this example comprises the following fields: "@@Includes," "@@FilterName=Display," "@@build=19," @@Translate_DLL=trans_display," and "@@FriendlyName=DisplayProperties." The "@@Includes" field designates that the keys/values that follow are to be categorized by the source ARL manager 214. An alternative field "@@Excludes" can instead be used to indicate that the keys/values that follow are not to be categorized. These two fields therefore provide control over which values will or will not be categorized during the up-filtering process.

The "@@FilterName=Display" field identifies the category (e.g., feature) to which the following keys/values pertain and, as is discussed below, is used by the target to search for corresponding registry entries of a down filter. The "@@build=19" field identifies the version number of the category tag (and it associated keys/values) and is used at the target to determine the compatability between the category tag and the applied down filter. The "@@Translate_DLL=trans_display" identifies the location of a dynamic link library (DLL) on the target, if in existence, that comprises registry translations that may be used to translate registry entries. Such translations are useful in situations in which the version of a given program on the source differs from that on the target and that difference is significant enough that the registry keys must be translated for the settings to be effective on the target. Finally, the "@@FriendlyName=DisplayProperties" field identifies a visual text string that is displayed to the user for purposes of filter identification. Although particular tag fields have been identified in the foregoing, additional and/or alternative fields can be used in the category tag 710, as desired.

Optionally, the filter (e.g., filter 708) can include a "wildcard" in the key or value name, indicated by an appropriate character, such as a carrot ("^"). Such a wildcard can be used to match multiple lines of the SRTF. For example, "[HKLM\Hardware\^]" would recursively match any key within the path of "[HKLM\Hardware\..]", including "[HKLM\Hardware\Graphics\Colors]" and "[HKLM\Hardware\Drives]". Although the wildcard is used at the end of the name in that illustration, it can instead be placed somewhere else, such as in the middle of the name.

As is noted above, the source ARP manager 214 searches the SRTF for the keys/values contained in the up filter to identify matches. Returning to the example of FIG. 7, the source ARP manager 214 would search for the key "[HKLM\Hardware\Graphics]" in the SRTF 700. Given that SRTF 700 includes that key, the source ARP manager 214 then determines whether the value "Resolution" is identified in association with the "HKLM\Hardware\Graphics" key. Given that the SRTF 700 includes the value "Resolution," a match is found.

Referring back to FIG. 6, when a match is found (as in FIG. 7), flow continues to block 606 at which the source ARP manager 214 associates the keys/values with the category tag and adds the keys/values to a categorized source registry text file (CSRTF) generated by the source ARP manager 214. This process is depicted in FIG. 7. As is indicated in that figure, a CSRTF 712 is generated that includes the key "[HKLM\Hardware\Graphics]" and value "'Resolution"="1024×768'" under the category tag 710 contained in the up filter 708.

With reference next to decision block 608, the source ARP manager 214 determines whether all of the up filters have been applied. If not, flow returns back to block 602 at which a new up filter is selected. The contents of that up filter are then compared with the contents of the SRTF in the manner described above to identify all matches. Referring again to decision block 608, if all up filters have been applied, flow continues to block 610 at which any remaining registry keys/values, i.e., keys/values that were not identified in a filter, are added to the CSRTF. These other keys/values are uncategorized entries. Referring to FIG. 7, the uncategorized registry entries are indicated by reference numeral 714.

Figure 8:
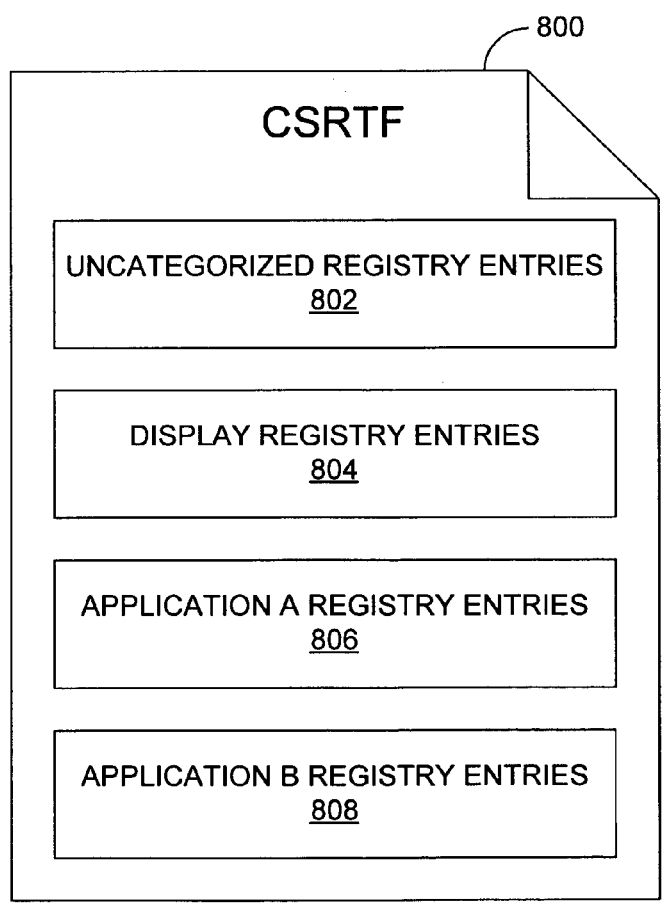
FIG. 8 is a schematic diagram that depicts a categorized source registry text file (CSRTF) that results from the up filtering depicted in FIGS. 6 and 7.

Returning once more to FIG. 6, the CSRTF is then stored by the source ARP manager 214, as indicated in block 612. At this point, a modified text file, the CSRTF, has been created that identifies all of the registry entries of the source 104, with at least some of those entries categorized in terms of the features to which they pertain with category tags. This result is depicted in FIG. 8. As is indicated in FIG. 8, an example CSRTF 800 includes uncategorized entries 802, display entries 804, entries 806 that relate to Application A, and entries 808 that relate to Application B.

The CSRTF can then be provided to one or more targets 106 for deployment. Such provision can be effected in various ways. For example, the CSRTF can be transmitted to the targets 106 via a network using a pre-boot execution environment (PXE) procedure. Network-based delivery need not be used, however. For instance, the CSRTF could instead be copied to the target by downloading the file from a flash drive device (e.g., a universal serial bus (USB) flash device).

The following table, Table I, provides additional examples of generation of a CSRTF using the filters. Specifically, Table I provides examples of different filters that can be applied to a given, and the CSRTFs that result.

TABLE I

| SRTF content | Filter example 1 | Filter example2 | Filter example 3 |
|---|---|---|---|
| [HKLM\hardware] "value1" = "a" "value2" = "b" | [HKLM\hardware] (no values) | [HKLM\ hardware] "value1" | [HKLM\ hardware] "value1" "value2" |
| no further values | | | |
| Matches added to a CSRTF Category | | | |
| | [HKLM\hardware] "value1" = "a" "value2" = "b" | [HKLM\ hardware] "value1" = "a" | [HKLM\ hardware] "value1" = "a" "value2" = "b" |
| Unmatched entries placed in Uncategorized section of CSRTF | | | |
| | (blank) | [HKLM\ hardware] "value2" = "b" | [HKLM\ hardware] (no values) |

Figure 9:
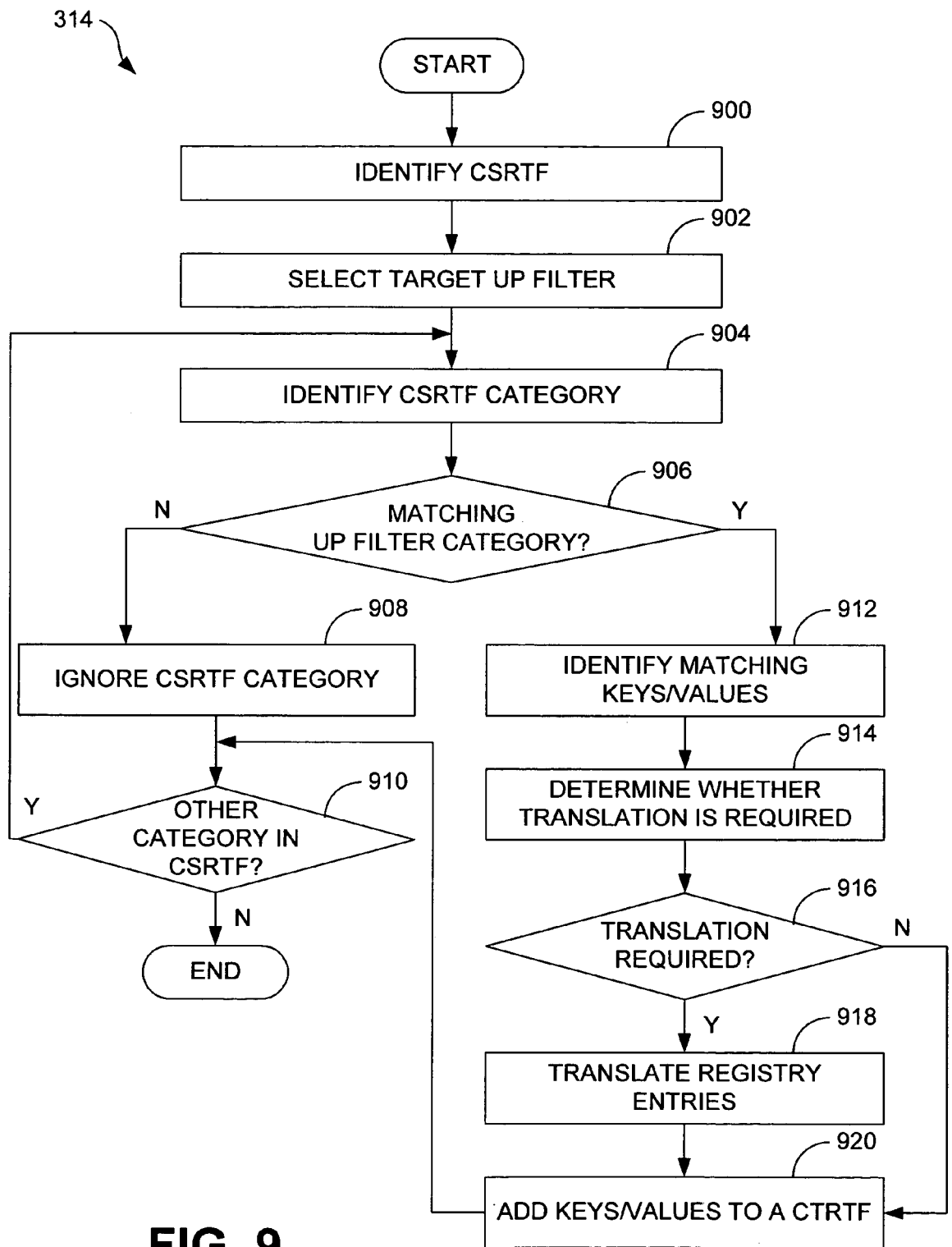
FIG. 9 is a flow diagram that illustrates an embodiment of operation of a target adaptive registry proliferation manager shown in FIG. 3 in performing a first stage of registry entry filtration.

FIG. 9 illustrates an example of operation of the target adaptive registry proliferation (ARP) manager 314 in applying an up filter to the CSRTF on a target 106 to effect a first stage of registry entry filtration. Beginning with block 900, the target ARP manager 314 identifies the CSRTF so that it can compare the categorized registry values with those contained in the up filter(s). To start this process, the manager 314 selects an up filter to apply to the CSRTF, as indicated in block 902. As with the selection of the source up filter described above, selection may comprise selecting a filter from a predetermined location on the device, such as "\Hard Disk\Up Filters." Although multiple up filters may be used, a single up filter that comprises all categories that pertain to the target 106 may suffice. For the purposes of this example, a single up filter is presumed for the remainder of the discussion of FIG. 9. In alternative embodiments, however, multiple up filters, each pertaining to a single category (e.g., feature) may be provided and individually applied to achieve similar results to those described in the following.

The target ARP manager 314 evaluates the various CSRTF categories from top to bottom through comparison with the up filter. Therefore, the resource 314 identifies a CSRTF category (e.g., the first listed category at this point), as indicated in block 904, and determines whether there is a matching category contained within the up filter, as indicated in decision block 906. For example, the resource identifies a category tag in the CSRTF and searches for a matching category tag in the up filter. If there is no matching category tag in the up filter, the registry entries associated with the CSRTF category may, for example, pertain to a feature (e.g., a user application) that is present on the source, but not on the target 106. In such a case, it does not make sense to import the registry entries and, therefore, the CSRTF category, and its associated registry entries, are ignored, as indicated in block 908. Flow then continues to decision block 912 at which it is determined whether the CSRTF comprises more categories to be evaluated. Assuming there are more categories to consider, flow returns to block 904 at which another CSRTF category is identified.

With reference again to decision block 906, the next category is compared with the up filter to determine whether the filter comprises a matching category. Assuming this time that the up filter does comprise the category, flow continues to block 912 at which the target ARP manager 314 identifies all matching keys/values between the CSRTF and the up filter within the category. Given that the keys/values of the CSRTF may pertain to a different version (e.g., different software version), the resource 314 further determines whether translation of the keys/values is necessary, as indicated in block 916. That determination can be made by, for example, identifying the location within the target 106 identified in the translation field of the CSRTF category tag (see discussion of FIG. 7) and determining if a translation DLL is exists in that location.

Referring to decision block 916, if translation is not required, flow continues down to block 920 discussed below. If translation is required, however, as is evidenced by the presence of a translation DLL on the target 106, flow continues to block 918 at which the entries associated with the category at issue are translated. This process comprises, for example, loading the DLL and calling an application program interface (API) to provide translated values for the values identified in the CSRTF. Then, with reference to block 920, the matching keys/values are added to a categorized target registry text file (CTRTF), which will, when completed, comprise a modified version of the CSRTF that only includes the keys/values that are pertinent to the target 106. Creation of the CTRTF therefore results in a first stage of registry entry filtration on the target 106.

At this point, flow returns to decision block 910, and the process described above continues until all of the CSRTF categories and associated registry entries have been evaluated, and the CTRTF is completed. Once the CTRTF is completed, flow for the up filtering process on the target 106 for the session is terminated.

Figure 10:
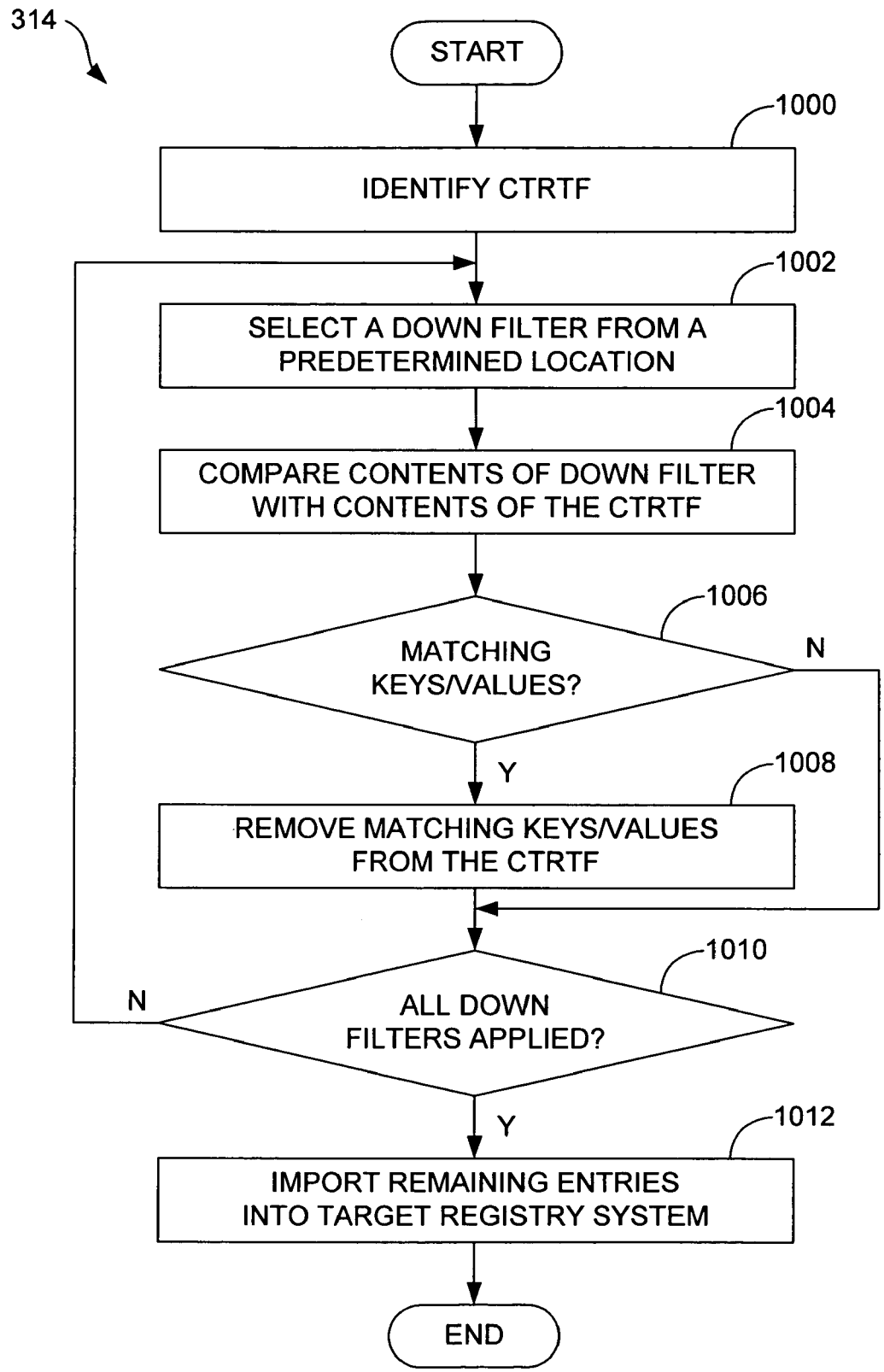
FIG. 10 is a flow diagram that illustrates an embodiment of operation of a target adaptive registry proliferation manager shown in FIG. 3 in performing a second stage of registry entry filtration.

FIG. 10 provides an example of operation of the target ARP manager 314 in applying a down filter on the target 106 to effect a second stage of registry entry filtration, and importation of desired registry entries. Beginning with block 1000, the target ARP manager 314 identifies the CTRTF that resulted from the application of the target up filter as described above in relation to FIG. 9. Once the CTRTF is located, the target ARP manager 314 selects a down filter to be applied to the CTRTF from a predetermined location, as indicated in block 1002. For instance, the target location "\Hard Disk\Down Filters" could be established for this purpose.

Figure 11:
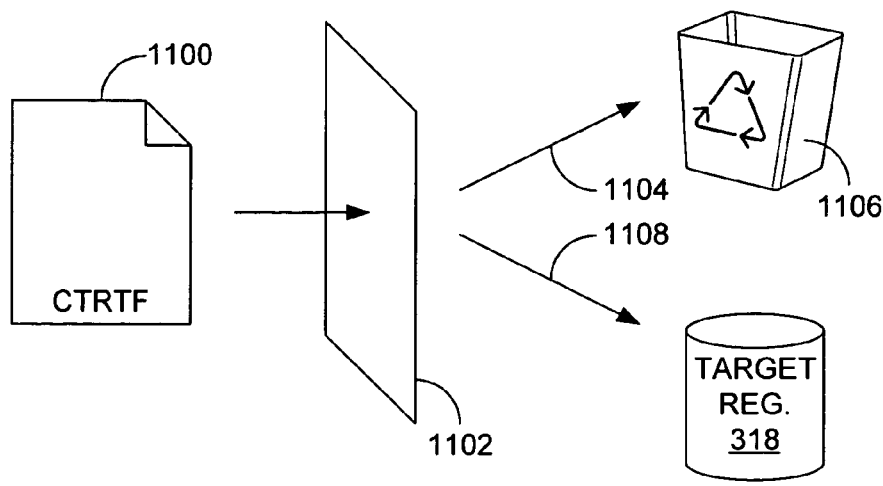
FIG. 11 is a schematic diagram that depicts a down-filtering process in which certain registry entries are implemented and others are ignored.
Figure 12:
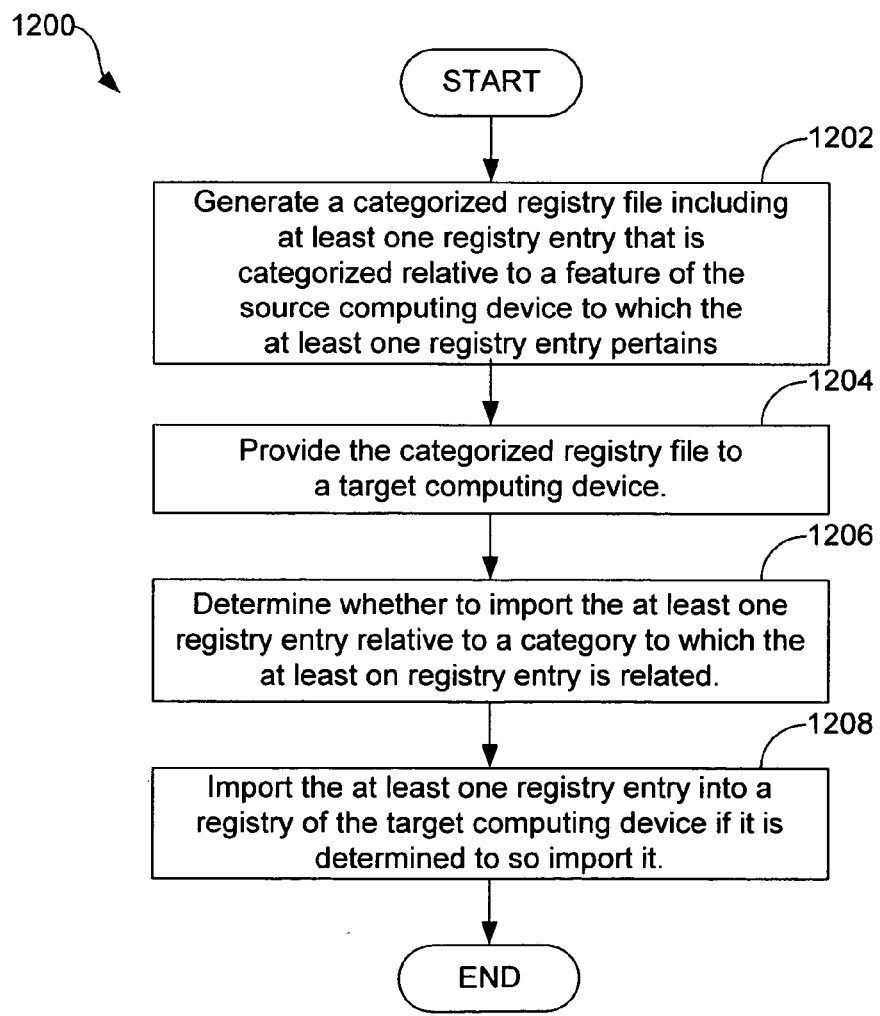
FIG. 12 is a flow diagram of an embodiment of a method for proliferating a computing device configuration.

Next, the contents of the selected down filter are compared to the contents of the CTRTF, as indicated in block 1004. Through that comparison, the target ARP manager 314 can determine which keys/values of the down filter match a key/value of the CTRTF. When a match is found, an undesired key/value has been identified that is not to be imported into the target registry system. Accordingly, with reference to decision block 1006, if the target ARP manager 314 identifies such a match, the matching keys/values are removed from the CTRTF, as indicated in block 1008. This process is schematically depicted in FIG. 11 in which, through comparison of the CTRTF 1100 and the down filter 1102, undesired entries are discarded, as indicated by path 1104 to trash/recycle bin 1106.

With reference back to decision block 1006 of FIG. 10, if the no matching keys/values are identified, flow continues down to decision block 1010 at which the target ARP manager 314 determines whether all of the down filters have been applied. If not, flow returns back to block 1002 at which a new down filter is selected. The contents of that up filter are then compared with the contents of the CTRTF in the manner described above to identify all matches. Referring again to decision block 1010, if all down filters have been applied, the only keys/values that remain are those that are intended to be imported into the target registry system 318. Accordingly, through the process described above in relation to FIG. 10, a second stage of filtration has been performed. At this point, flow continues to block 1012 at which the target ARP manager 314 imports the remaining entries (keys/values) into the target registry system. This process is also schematically depicted in FIG. 11, with path 1108 directed to registry system 318. Another method for proliferating a computer device configuration is described in FIG. 11. As is indicated in that figure, the method 1100 comprises generating a categorized registry file including at least one registry entry that is categorized relative to a feature of the source computing device to which the at least one registry entry pertains (1102), providing the categorized registry file to a target computing device (1104), determining whether to import the at least one registry entry relative to a category to which the at least one registry entry is related (1106), and importing the at least one registry entry into a registry of the target computing device if it is determined to so import it (1108).

What is claimed is:

1. A method for proliferating a configuration of a source computing device, the method comprising:

generating a categorized registry file including registry entries that are categorized relative to features of the source computing device to which the registry entries pertain;

providing the categorized registry file to a target computing device;

the target computing device determining as to each registry entry whether to import the registry entry relative to a category to which the registry entry is related;

the target computing device importing into a registry of the target computing device at least one registry entry from the categorized registry file; and the target computing device intentionally not importing into the registry of the target computing device at least one other registry entry from the categorized registry file.

2. The method of claim 1, wherein generating the categorized file comprises categorizing at least one registry key and at least one registry value associated with the registry key.

3. The method of claim 1, wherein generating the categorized file including at least one registry entry that is categorized relative to the feature comprises generating a categorized file including at least one registry entry that is categorized relative to a user application that exists on the source computing device.

4. The method of claim 1, wherein generating the categorized file including at least one registry entry that is categorized relative to the feature comprises generating a categorized file including at least one registry entry that is categorized relative to a user interface device that is used in conjunction with the source computing device.

5. The method of claim 1, wherein generating the categorized registry file comprises applying an up filter to the source registry text file to produce the categorized file, the up filter being related to the feature.

6. The method of claim 5, wherein applying an up filter comprises comparing registry entries of the filter with registry entries of the source registry text file that contains registry entries of the source computing device.

7. The method of claim 1, wherein providing the categorized registry file to a target computing device comprises transmitting the categorized registry file to the target computing device via a network.

8. The method of claim 1, wherein determining whether to import the at least one registry entry comprises the target computing device applying a down filter to the categorized registry file to produce a modified version of the categorized registry file.

9. The method of claim 8, wherein applying a down filter comprises the target computing device comparing registry entries of the down filter with registry entries of the categorized registry file to identify matching entries, and removing the matching entries so that those entries are not imported into the target registry.

10. A system for proliferating a configuration of a source computing device to a target computing device, the system comprising:

means for creating a registry file that includes multiple registry entries;

means provided on the target computing device for determining as to each registry entry of the registry file whether to import the registry entry into a registry of the target computing device;

means provided on the target computing device for importing registry entries from the registry file into the target computing device registry; and means provided on the target computing device for preventing importation of registry entries from the registry file into the target computing device registry.

11. The system of claim 10, wherein the means for creating comprise a program that is configured to compare registry entries of the source computing device with registry entries of filters that each pertain to a different feature associated with the source computing device.

12. The system of claim 10, wherein the means for determining comprise a program that is configured to receive the registry file and compare the registry entries of the registry file with categorized registry entries of a filter, wherein the categories of the filter relate to features associated with the target computing device.

13. A computer-readable medium that stores a source adaptive registry proliferation manager, the manager comprising:

logic configured to compare the contents of a source registry text file with the contents of multiple up filters to identify keys of the filters that match keys of the source registry text file, each source registry text file key being associated with a particular registry entry of the source registry text file and each up filter pertaining to a different computing device feature for which there may be a registry entry in the source registry text file;

logic configured to associate a category tag with each registry entry having a key that matches a key of an up filter to create categorized registry entries that are categorized by their associated tags; and logic configured to store the categorized registry entries in a categorized source registry text file.

14. The computer-readable medium of claim 13, wherein one of the computing device features for which there is an up filter is a user application of the source computing device.

15. The computer-readable medium of claim 13, wherein one of the computing device features for which there is an up filter is a user interface device that is used in conjunction with the source computing device.

16. A computer-readable medium that stores a target adaptive registry proliferation manager, the manager comprising:

logic configured to receive a source registry text file comprising multiple categorized registry entries that are categorized by associated category tags;

logic configured to compare the category tags of the categorized registry entries with category tags of multiple down filters to identify matching category tags;

logic configured to discard any categorized registry entries having a category tag that matches a category tag of a down filter; and logic configured to store any remaining categorized registry entries to a registry of a target computing device without storing the discarded categorized registry entries so as to exclude those entries from the target computing device registry.

17. The computer-readable medium of claim 16, further comprising logic configured to determine whether registry entries are to be translated prior to being stored and logic configured to initiate translation of registry entries.

18. The computer-readable medium of claim 16, further comprising logic configured to compare the category tags of the categorized registry entries with category tags of an up filter to identify category tag common to both the file and the up filter.

* * * * *